Jan. 25, 1966  C. R. FROHMBERG  3,230,779
D.C. TORQUE MOTOR
Filed March 10, 1961  2 Sheets-Sheet 1

INVENTOR:
Clifford Ralph Frohmberg
By Richard K. Ehrlich
Attorney

Jan. 25, 1966 C. R. FROHMBERG 3,230,779
D.C. TORQUE MOTOR
Filed March 10, 1961 2 Sheets-Sheet 2
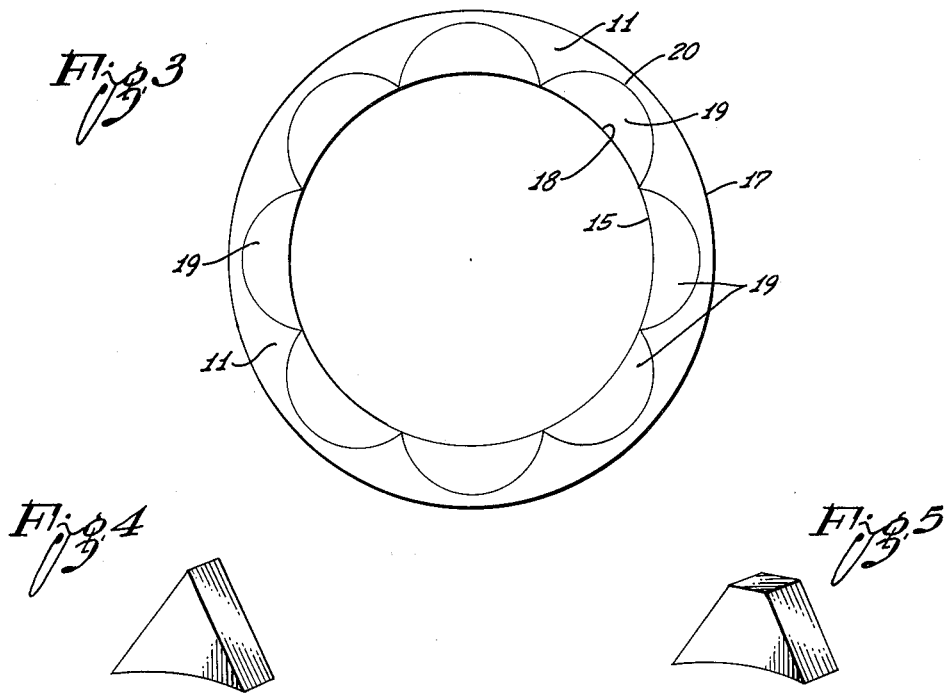
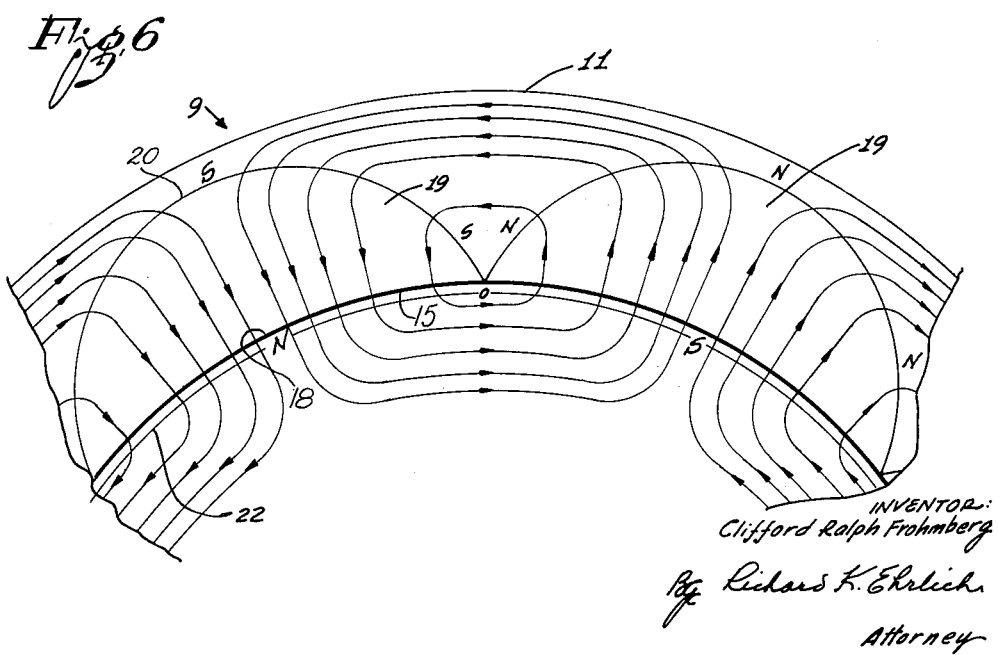
INVENTOR:
Clifford Ralph Frohmberg
By Richard K. Ehrlich
Attorney

United States Patent Office 3,230,779
Patented Jan. 25, 1966

3,230,779
D.C. TORQUE MOTOR
Clifford Ralph Frohmberg, Woodland Hills, Calif., assignor to Litton Systems, Inc., Beverly Hills, Calif.
Filed Mar. 10, 1961, Ser. No. 94,935
12 Claims. (Cl. 74—5.34)

The present invention relates to a permanent magnet D.C. torque motor and more particularly to a permanent magnet D.C. torque motor wherein the magnetic flux generated by the permanent magnet is constrained within the internal area of the motor whereby the motor can be positioned adjacent flux sensitive devices.

At the present time there is a severe need in the art for a small size, high torque motor which can be used in close physical association with flux sensitive devices. For example, in the inertial guidance field ultra-precision miniature inertial platforms are being designed for use in numerous air-borne applications. As is well known to those skilled in the art, a number of devices such as gyroscopes and accelerometers are utilized in the mechanization of inertial platforms which are extremely sensitive to magnetomotive flux. For example, the movement of the pendulum unit of a torque balance type pendulous accelerometer is sensed by an extremely sensitive magnetic flux detector so that it is essential to the satisfactory performance of the accelerometers that there be no stray or background flux within the platform area.

The platform is stabilized, of course, by the gyroscopes whose operation is also affected by stray flux. The gyroscopes operate to maintain a stabilizable element stabilized by sensing movement of the stabilizer element relative to some fixed reference. The movement is detected by flux sensitive gyro pickoffs which note the movement of the gyro outer cases relative to the gyro rotors and generate signals representative of the movement. The signals are then fed to torque motors, the signals actuating the torque motors to torque the stabilizable element to neutralize the movement of the element and the gyro housings relative to the gyro rotors.

In the prior art, A.C. servomotors have generally been used to torque or drive the stabilizable platform back to its initial position. However, because of the low torque, high speed characteristics of such a motor, the motor must generally be coupled to the stabilizable element by means of a gear train which introduces the inherent backlash inaccuracy of gear trains into the inertial system. Furthermore, the gear train tends to increase the size as well as the cost of the inertial platform.

Attention has been given to the thought of using A.C. motors of sufficient torque to drive the stabilizable element directly, but use of such motors has been generally frustrated by the fact that the size of such A.C. motors would result in a platform so bulky that it could not be used in most air-borne applications.

In order to overcome the size problem involved with A.C. motors, attention has been directed to D.C. torque motors which are generally smaller in size relative to the amount of torque produced. However, it has been found that most D.C. motors cannot be used to torque an inertial platform since they do not generate a uniform torque but, on the contrary, produce torque in discrete or non-continuous steps.

There is, however, one type of permanent magnet D.C. torque motor which does produce the continuous torquing force needed by using a plurality of permanent magnets in such a manner that they produce a sinusoidally varying flux field in the air gap surrounding the motor armature. While this type of motor is sufficiently small in size to be utilized in present-day miniaturized inertial platforms, the motor cannot be utilized in high accuracy inertial applications since the flux field produced by the permanent magnets tends to leak into the neighboring area around the motor so that the operation of the gyroscopes and accelerometers positioned in proximity to the motor is adversely affected.

The present invention overcomes the foregoing-described and other limitations of prior art torque motors by providing a D.C. torque motor with at least a pair of permanent magnets positioned in a low reluctance ring with their magnetic axes radially oriented and with the magnets having such a configuration that the magnetomotive force generated by the magnet varies in a continuous manner along the width of the magnet, whereby the torque produced by the interaction of the flux generated by the magnet and the motor armature is constant regardless of the angular position of the motor rotor element. More particularly, the magnets should be shaped such that the distance between opposite pole surfaces or, in other words, the magnet length varies from a minimum at one end continuously to a maximum at some point along the width of the magnet.

The magnetic axes of the motor magnets are radially oriented according to the invention whereby the distance between the magnet poles can be reduced so that the axial flux leakage outside the internal motor area is concomitantly reduced. Furthermore, the magnets are radially shielded from the area outside the motor by the low reluctance ring whereby the stray radial flux field is constrained to the ring.

In accordance with one embodiment of the invention, a D.C. torque motor is mechanized with a low reluctance annular stator having a series of slots cut sequentially in the inside circular side of the stator with a series of crescent shaped permanent magnets positioned in register with the slots. In accordance with other embodiments of the invention, the annular low reluctance stator element has a plurality of triangularly shaped slots cut in the inside circular side and a plurality of triangularly shaped magnets positioned in register with the slots or a plurality of trapezoidal slots with trapezoidally shaped magnets therein.

It is, therefore, an object of the present invention to provide a relatively small size, high torque motor for use in inertial platforms of inertial navigation systems.

It is another object of the present invention to provide a permanent magnet D.C. torque motor having the magnetic axes of the magnets radially oriented relative to the motor rotor element.

It is still another object of the present invention to provide a D.C. torque motor which produces little external flux leakage.

It is a still further object of the invention to provide a D.C. torque motor which generates little or no external flux and which is capable of producing a continuously varying air gap flux density between motor poles so that a uniform torque is exerted upon the rotor independent of its angular position.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the invention.

FIGURE 3 is a side view of a stator element of the invention;

FIGURES 4 and 5 are three-dimensional views of triangularly and trapezoidally shaped permanent magnets, respectively, of the present invention; and FIGURE 6 is a fragmentary side view of the motor of the invention.

Figure 1:
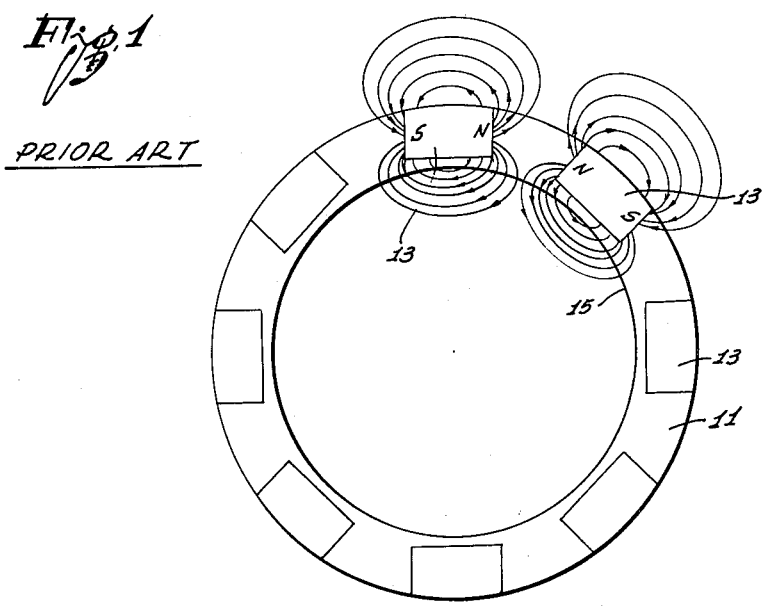
FIGURE 1 is a side view of a stator element of a prior art D.C. torque motor.

Referring now to the drawings wherein like or corresponding parts are designated by the same reference character throughout the several views, there is shown in FIGURE 1 a side view of a stator element of a conventional prior art permanent magnet D.C. torque motor. As shown in FIGURE 1, an annular ring 11 of soft iron having an inner circular side 15 and an outer circular side has a number of rectangular spaced slots cut in the outer circumference of the ring and a plurality of rectangular permanent magnets 13 positioned in register therewith. Furthermore, each of the magnets has its magnetic axis or length oriented orthogonal to the axis and radius of the ring, the length of any magnet being defined in the art as the dimension parallel with the magnetic axis of the magnet. As is indicated in FIGURE 1, each permanent magnet produces a magnetic flux field which traverses the air gap surrounding the inner side 15 and a motor rotor element not shown, positioned within the ring and rotatable about the ring.

However, as is shown in the figure, a substantial amount of flux passes out from the outer circumference of the ring and produces a strong radial stray field. Furthermore, an equally strong axial field traverses the external air space adjacent the motor. While these stray magnetomotive flux fields may be harmless in numerous applications, in those applications which require the torque motor to be positioned next to other flux sensitive devices the external flux fields introduce inaccuracy into the operation of the other devices.

Accordingly, the D.C. motor cannot be used in any application which requires the placing of flux sensitive devices next to the motor. For example, D.C. torque motors of the type shown in FIGURE 1 could not be used for torquing an inertial platform of a precision inertial navigation system. The reason why such a motor could not be used in such a system is apparent when FIGURE 2 is analyzed.

Figure 2:
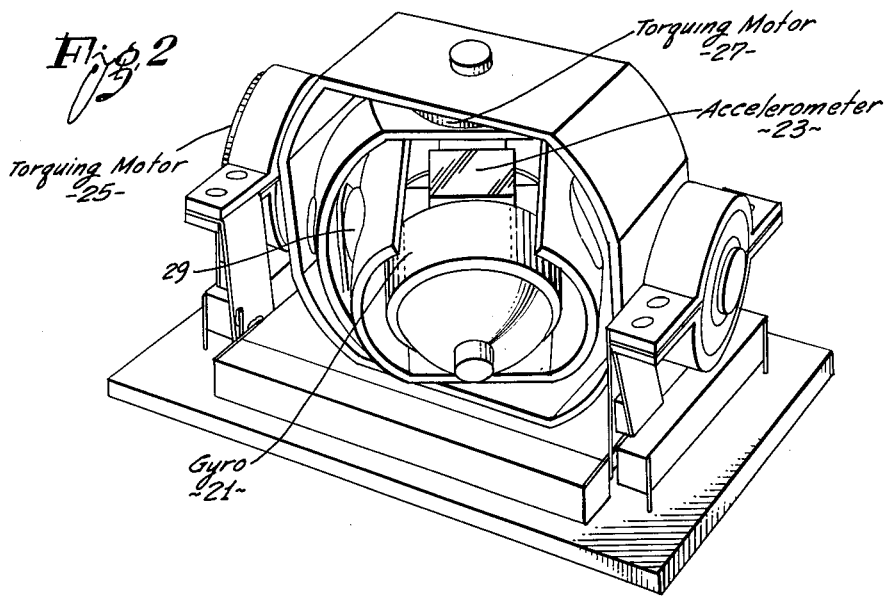
FIGURE 2 is a three-dimensional view of an inertial platform utilizing D.C. torque motors of the present invention.

Referring to FIGURE 2, there is shown therein an inertial platform utilizing D.C. torque motors of the present invention. However, the present reference to FIGURE 2 is made simply to show the compactness and the close proximity of the platform gyros, accelerometers and torque motors. When it is remembered that the accuracy of accelerometers and gyroscopes is dependent upon flux sensitive devices, it is clear that any flux leakage from the torque motors positioned in proximity with the gyros and accelerometers would severely affect the accuracy of these instruments. Accordingly, such torque motors cannot be used in precision miniaturized platforms of the type shown in FIGURE 2.

It should also be noted that since the magnets are rectangular in shape and positioned in sequence with their magnetic axes oriented in a circular manner without the placement of iron or some other low reluctance shunt material between the magnets and the armature windings, the magnetomotive force generated along the length of the magnets would produce a strong air gap flux in the area between adjacent magnets and little flux elsewhere so that the motor would operate as a stepping motor. In order to overcome this problem, a varying thickness of iron is positioned between the magnet and the air gap commencing with little or no iron material at the center of the magnet and increasing to a maximum at either end in order to shunt substantial portions of the flux field through the iron core. It is clear, of course, as is shown in FIGURE 1, that the necessity of placing iron between the magnets and armature windings forces the diameter of ring 11 to be greater so that the over-all size of the motor must be increased. Furthermore, since the magnetic axis of each magnet is circumferentially oriented, the distance between the magnetic poles must be substantial in order to keep the number of individual magnets needed to a minimum. However, as is well known, the amount of external leakage flux produced by each magnet is directly proportional to the distance between the magnet poles.

Referring now to FIGURE 3, there is shown a stator element 9 of a D.C. torque motor of the invention. This invention can be used, of course, in the inertial platform shown in FIGURE 2 and as shown in FIGURE 2 permits the direct torquing of the platform gimbals without the necessity of gearing and without leaking any appreciable amount of flux. Accordingly, the accuracy of the platform is increased by the use of the D.C. torque motor of the present invention rather than decreased since no error is introduced as a result of gear train backlash, and the accuracy of the gyros and accelerometers is not affected by flux leakage from the motors.

Directing attention now with particularity to the stator of the torque motor of the present invention, as is shown in FIGURE 3, the stator element includes an annular ring 11 having an inner circular side or surface 15 and an outer circular side or surface 17 and a plurality of crescent shaped permanent magnets 19. Furthermore, each magnet has a concave surface 18 and a convex surface 20 and is positioned in register with a corresponding crescent shaped slot cut in ring 11, the concave surface of the slot being coincident with a portion of side 15.

As is indicated in FIGURE 6, concave side 18 and convex side 20 of each magnet are the oppositely polarized magnetic poles of the magnet so that the magnetic axis of each magnet is radially oriented and has a configuration such that the flux field in the air gap surrounding the armature windings varies sinusoidally along the circumference of ring 11 without the aid of any iron or low reluctance shunt material, the armature being, of course, circumscribed by side 15 of ring 11.

Furthermore, since each magnet 19 is radially oriented, the circular surface or pole of each magnet can be shielded by the low reluctance iron material of ring 11 without shorting out the magnet. Accordingly, the radially oriented flux which would otherwise leak out to the area surrounding the motor is constrained to the low reluctance path within ring 11. Hence, the radially oriented flux leakage is virtually eliminated.

Continuing with the discussion of the invention, the axially oriented leakage flux is substantially reduced by minimizing the distance between the magnetic pole surfaces, the magnitude of the axial flux being, of course, proportional to the distance between the pole surfaces. In the present invention, the distance between the magnet poles can be substantially reduced because of the radial orientation of the magnetic axes whereby the amount of surface 15 covered by the flux generated by each magnet is independent of pole separation.

Referring again with more particularity to the stator element shown in FIGURE 3, it is apparent that each magnet has an area defined by a crescent configuration. While it has been found that a crescent configuration generates a satisfactory sinusoidally varying flux field about the circumference of ring 11 and the air gap adjacent thereto, the magnets are by no means limited to this configuration. More basically, any configuration which results in a variation of the distance between the magnetic poles or surfaces along the width or base 18 of the magnets sufficient to produce a magnetomotive force variation along base 18 resulting in a uniformly varying flux field is satisfactory. For example, a three-sided configuration such as the triangular configuration shown in FIGURE 4 or the trapezoidal configuration shown in FIGURE 5 can be used. More generally, it can be stated that the magnet should have a configuration such that the distance between the surfaces or poles of the magnet should vary along the width or direction orthogonal to the magnet length and face from a minimum at one end to a maximum.

Continuing with the description of the operation of the D.C. motor of the invention, attention is directed to FIGURE 6 wherein there is shown a side view of a segment of the motor of the invention including stator element 9 which in turn includes annular ring 11 made of soft iron, crescent shaped magnets 19, and an armature 22 having a plurality of windings thereon, which for the purpose of indicating the nature of the flux field generated by magnets 19 can be considered as a low reluctance disk. As shown in FIGURE 6, adjacent magnets are oppositely polarized so that half the flux generated by each magnet is shared with the preceding magnet in sequence and half is shared with the subsequent magnet in sequence. Accordingly, a flux field pattern is generated as shown in FIGURE 6.

As is also indicated in FIGURE 6, little or no flux field is generated in the air gap in the vicinity of the point of juncture of adjacent magnets. However, as the distance from the point of juncture of adjacent magnets increases, the flux field increases to a maximum at a point midway along the width or concave side 18 of the magnets and then decreases again to little or no flux field. It can be shown that this variation in flux field intensity is sinusoidal in character so that armature 22 is uniformly and continuously torqued about its axis whenever a signal is applied to the armature windings.

As has been hereinbefore stated, axially oriented stray or leakage flux is minimized since the length or distance between the north and south poles of each magnet is minimized. Furthermore, as is indicated in FIGURE 6 radially oriented stray or leakage flux is almost virtually eliminated because of the shunting effect of ring 11. For example, as shown in the figure, the flux lines linking the north and south poles of adjacent magnets pass through low reluctance iron ring 11 rather than out the outer circumference of the ring and through the relatively high reluctance of the air gap and then back into the ring again. Hence, the motor of the invention can be operated in close proximity to magnetomotive flux sensitive devices without affecting their operation.

In FIGURE 2 there is shown a partially disassembled miniaturized ultra-precision inertial platform suitable for use in the most advanced air-borne inertial guidance systems. As is indicated in FIGURE 2, a gyro 21, as well as another gyro not visible, is mounted on the platform with a plurality of accelerometers 23, only one of which is visible in the figure. In addition to the accelerometers and gyroscopes, the platform also includes four D.C. torque motors of the present invention, only three motors 25, 27, 29 being shown in the figure. As is apparent from a brief examination of the figure, the gyroscopes and accelerometers are mounted in extremely close proximity to the D.C. torque motors. However, the torque sensitive pickoff devices of the accelerometers and gyroscopes are not affected by the close proximity of the four D.C. torque motors since, as has been hereinbefore explained, little or no flux leakage from the motors is experienced.

It will, of course, be recognized that numerous modifications and alterations may be made in the D.C. torque motor of the present invention without departing from the spirit or scope of the invention. For example, it is apparent that permanent magnet D.C. motors can be mechanized with the magnets positioned on the motor rotor element instead of the stator, and the armature windings can be positioned on the stator element. Furthermore, a number of rectangularly shaped magnets could be positioned in sequence with their lengths radially oriented and varying in size from a minimum at one end to a maximum. However, this of course would be equivalent to the use of one solid magnet having the same resultant configuration. Accordingly, the invention is limited only by the spirit and scope of the appended claims.

What is claimed as new is:

1. In a D.C. torque motor, the combination comprising: a low reluctance ring having inner and outer concentric circular sides, said ring having a plurality of contiguous slots cut therein along said inner circular side; and a corresponding plurality of crescent shaped permanent magnets positioned in said slots with their axes of magnetization substantially radially oriented relative to said ring.

2. In a D.C. torque motor wherein the presence of magnetic flux in the areas adjacent to the motor are substantially eliminated, the combination comprising: a circular contiguously slotted low reluctance member; and a plurality of crescent shaped permanent magnets positioned in the slots, the concave surfaces of said magnets forming a contiguous circular surface, said magnets having their magnetic axes substantially radially oriented in relation to said contiguous circular surface.

3. In a D.C. torque motor, the combination comprising: a motor armature; an annular low reluctance stator member having inner and outer concentric circular surfaces, said armature being positioned within said stator so that said inner circular surface circumscribes said armature; a plurality of permanent magnets, each having oppositely polarized surfaces defining a magnetic axis, said annular reluctance stator member having a plurality of slots cut in said inner circular surface, each contiguous with its adjacent slots, to receive said magnets substantially in register, the distance between said oppositely polarized surfaces of each of said magnets varying over a preselected portion of said magnets from a minimum distance to a maximum distance whereby the magnetomotive flux field generated thereby varies in a continuous manner about said inner circular surface.

4. The combination defined in claim 3 wherein said permanent magnets are positioned in said slots in said stator member with their magnetic axes substantially radially oriented relative to said stator member.

5. In a D.C. torque motor, the combination comprising: a low reluctance member having a plurality of slots therein; and a plurality of permanent magnets positioned in said slots, said magnets having oppositely polarized surfaces, the distance between said oppositely polarized surfaces varying continuously from a minimum distance at one end to a maximum distance between the ends of said magnets for producing a sinusoidally varying flux field.

6. The combination defined in claim 5 wherein one of said oppositely polarized surfaces is concave and the other is convex.

7. In a gyro-stabilized platform for use in an inertial guidance system, the combination comprising: a reference frame; a stabilizable element rotatably connected to said frame, said element having first, second, and third axes of rotation with respect to said reference frame; first, second, and third D.C. torque motors for directly rotating said stabilizable element relative to said reference frame about said first, second, and third axes, respectively, in response to predetermined actuating signals, each of said D.C. torque motors including a slotted low reluctance ring having crescent shaped permanent magnets positioned in the slots of said ring, the magnetic axes of said magnets being radially oriented relative to said ring whereby the magnetic leakage flux is restricted to said motor; inertial means including gyroscopes, said inertial means producing the predetermined actuating signals; and acceleration sensing means mounted on said stabilizable element, said acceleration sensing means, said gyroscopes, and said torque motors being positioned in close proximity to one another to produce an extremely small size platform.

8. In a gyro-stabilized platform for use in an inertial guidance system, the combination comprising: a reference frame; a stabilizable element rotatably connected to said reference frame, said element having first, second, and third axes of rotation with respect to said reference frame; first, second, and third D.C. torque motors for directly rotating said stabilizable element relative to said reference frame about said first, second, and third axes, respectively, in response to predetermined actuating signals, each of said D.C. torque motors including a slotted low reluctance circular member and permanent magnets positioned in the slots, each of said magnets having a pair of first and second oppositely polarized surfaces defining a magnetic axis, whereby the magnetic leakage flux from said magnets is restricted to said motor, the distance between said first and second surfaces varying continuously from a minimum at one end to a maximum at a preselected point to produce a sinusoidally varying motor flux field, interial means including gyroscopes, said inertial means producing the predetermined actuating signals; and acceleration sensing means mounted on said stabilizable element, said acceleration sensing means, said gyroscopes, and said torque motors being positioned in close proximity to one another to produce an extremely small size platform.

9. The combination defined in claim 8 wherein said preselected point is substantially coincident with a point midway along said first surface of each of said permanent magnets.

10. In a D.C. torque motor, the combination comprising: a circular low reluctance member having a circular surface with a plurality of slots cut therein; and a plurality of permanent magnets having oppositely polarized surfaces, the distance between said oppositely polarized surfaces of each magnet varying in a continuous manner from minimum distances at the ends to a maximum distance, said magnets being positioned in said slots contiguous at one point with the adjacent magnet to generate a sinusoidally varying flux field about said circular low reluctance member.

11. The combination defined in claim 10 wherein each of said magnets has a magnetic axis defined by said oppositely polarized surfaces, said magnets being positioned in said circular member with their magnetic axes radially oriented relative to said circular member.

12. The combination in claim 11 wherein said magnets have a crescent shape with a convex surface and a curved surface opposite said convex surface, said curved surface and said convex surface being oppositely polarized and said magnets being positioned in said slots so that said curved surfaces of said magnets form a circular surface.

References Cited by the Examiner

UNITED STATES PATENTS

| 1,985,082 | 12/1934 | Faus | 74—5.46 X |
| 2,547,968 | 4/1951 | Paulus | 74—5.6 |

FOREIGN PATENTS

| 839,770 | 6/1960 | Great Britain. |

BROUGHTON G. DURHAM, *Primary Examiner.*